Aug. 19, 1958      F. E. MERGEN      2,848,592
ADJUSTABLE HEATING UNITS FOR ELECTRIC RANGE OVENS
Filed Dec. 29, 1955      3 Sheets-Sheet 1

Inventor
Frederick E. Mergen
by Andrew L. Hubbard
Attorney

Inventor
Frederick E. Mergen
by Andrew B. Hubbard
Attorney

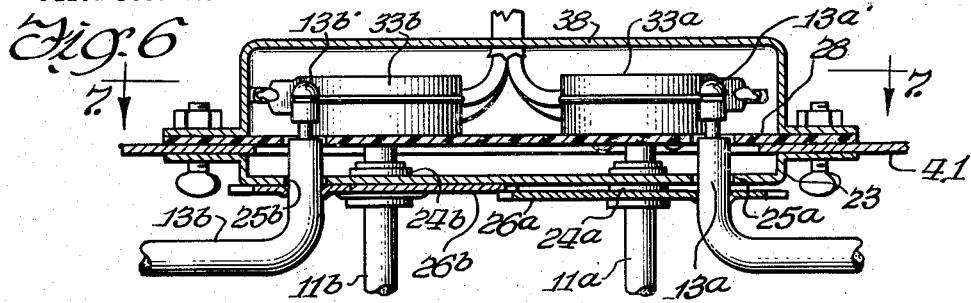
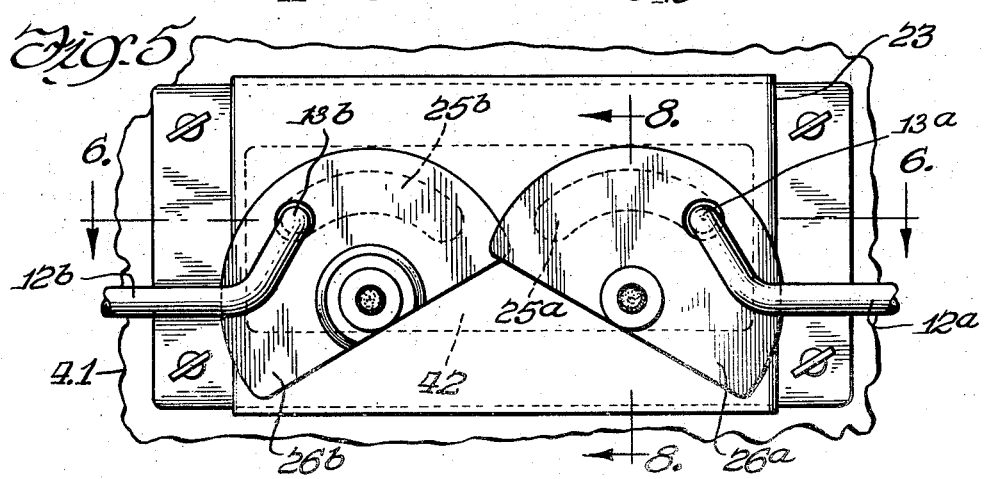
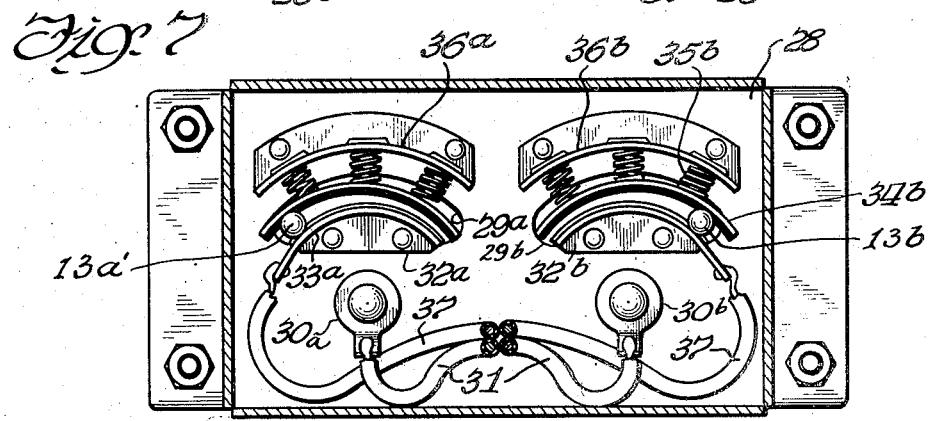
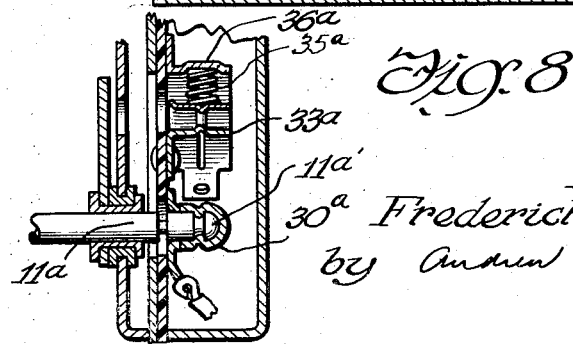

United States Patent Office 2,848,592
Patented Aug. 19, 1958

2,848,592
ADJUSTABLE HEATING UNITS FOR ELECTRIC RANGE OVENS

Frederick E. Mergen, Oak Park, Ill., assignor to General Electric Company, a corporation of New York Application December 29, 1955, Serial No. 556,162

9 Claims. (Cl. 219—35)

This invention relates to cooking appliances and, in particular, to angularly adjustable heating elements for the ovens of electric ranges and the like.

Electric range ovens normally have at least two resistance type heating elements, disposed respectively at the top and the bottom of the oven cavity. For baking, it is the usual practice to energize only the bottom unit or, alternatively, to energize the bottom unit at full wattage and the upper unit at reduced wattage. For boiling—which includes cooking by rotisserie methods—usually only the upper unit is energized. Range ovens embodying these conventional arrangements have produced very satisfactory cooking results for many years; and yet, even with the increased wattages used in such ranges at the present time, the time necessary to obtain the desired condition of "doneness" in a baking, roasting, or broiling operation remains unduly long. In broiling, which is performed largely by radiant heat, the distance from the radiant heat element to the foodstuff is, of course, an important factor in the speed of broiling; and in baking and roasting, which depend largely upon convected heat, the disposition of heating elements, relative to the shape of the oven and the space occupied by the foodstuff, influences the distribution and intensity of the heat energy available for the cooking operation.

I have determined that the quality of the cooked product can be improved and the speed of operation increased by making either or both of the respective upper and lower heating units angularly adjustable; in a typical embodiment, for example, the respective heating units are arranged so that those at the top of the oven may be swung down to form an inverted V having leg portions substantially straddling the foodstuff from above, and the heating elements at the bottom folded up to provide an upright V having arm portions substantially embracing the foodstuff from beneath. Preferably, of course, the upper and lower heating elements are independently adjustable so that either may have its normal flat configuration relative to the adjacent oven wall while the other is in its adjusted angular position. Other arrangements which are advantageous comprise mounting the adjustable heating elements on the inner side walls of the oven, or at diagonally disposed upper and lower corner portions of the oven.

Pursuant to my invention, the actual heat source may be brought into closer proximity to the foodstuff, particularly when the foodstuff is bulky and of irregular outline, such as a fowl or roast, than in any other cooking appliance of which I am aware. The angular adjustability of the heating elements makes it possible to establish advantageous heat distribution patterns, whether radiant or convected, which improve the speed and the results of the cooking operation.

It is, therefore, an object of the invention to provide a heating chamber with one or more heating elements which can be adjusted angularly relative to the disposition of the material to be heated within the chamber.

It is another object of the invention to provide an oven or broiler heating element having means whereby the heating element may be physically positioned relative to the material being cooked to substantially envelop the material in radiant heat.

It is a further object of the invention to provide, in a cooking oven, a multiple unit heating element having angularly adjustable portions, whereby said heating element portions may be brought into the most advantageous relation to the material being cooked.

It is a further object of the invention to provide an improved mounting means for oven heating units.

Other features and advantages of the invention will be understood from the following detailed description of presently preferred embodiments thereof, read in the light of the accompanying drawings in which, Fig. 1 is a fragmentary front elevational view of an electric range showing the oven heating elements in an angular relation to the foodstuff and the top and bottom oven walls;

Fig. 5 is a rear elevational view of the rear-end mounting of the heating elements;

Fig. 6 is a plan sectional view, taken on lines 6—6 of Fig. 5;

Fig. 7 is a rear elevation of the terminal structure of Fig. 5, taken in section 7—7 of Fig. 6;

Fig. 8 is a fragmentary side sectional elevation, in section on lines 8—8 of Fig. 5;

Fig. 9 is a fragmentary elevational view, similar to that of Fig. 1, showing side-mounted heating elements;

Figure 1:
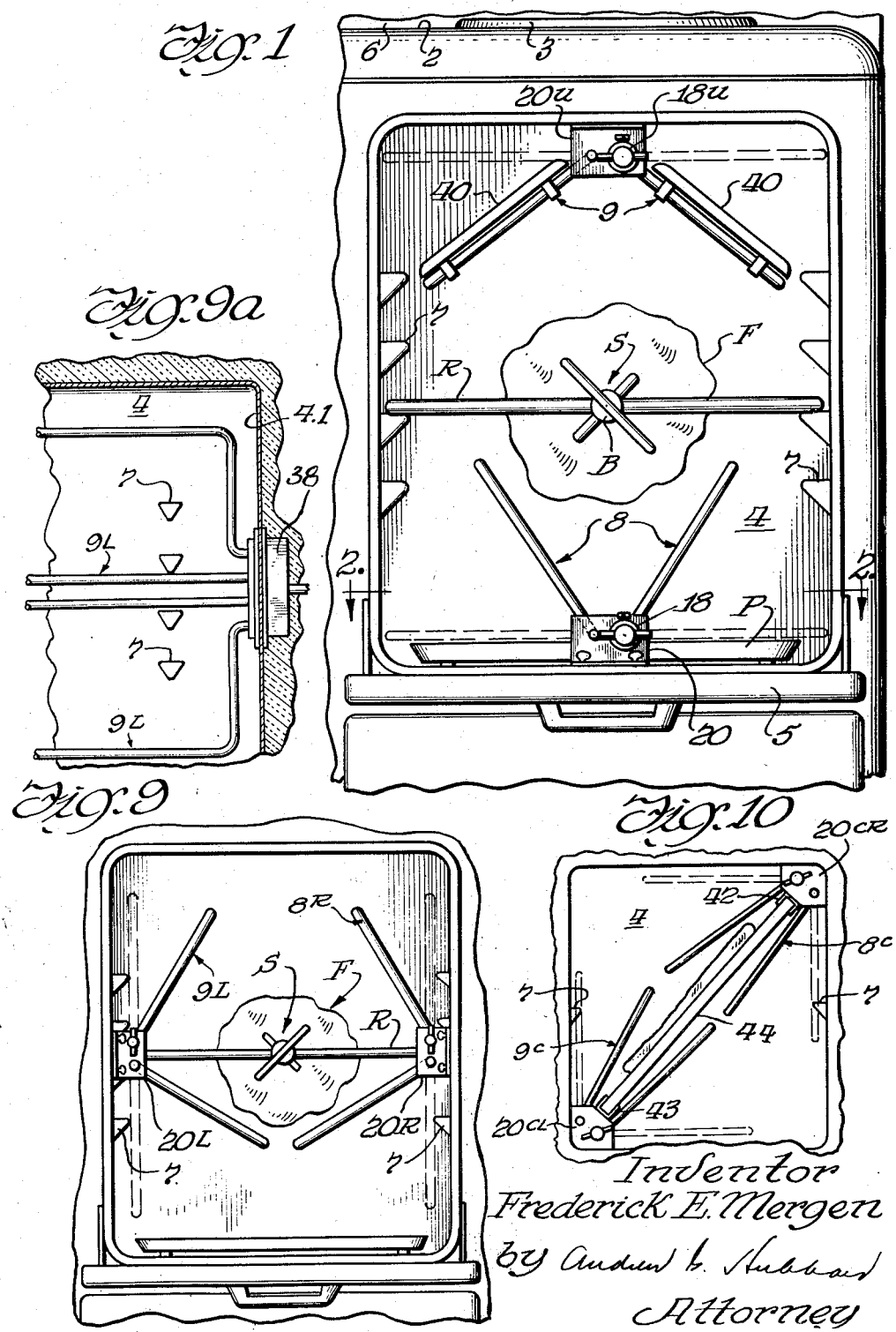

Fig. 9a is a side elevational view of the interior of the oven of Fig. 9, showing a quadrilateral configuration of the heating elements and the disposition thereof relative to oven rack supporting means; and Fig. 10 is a fragmentary front elevational view of an oven, showing the heating elements arranged in upper and lower diagonal corners thereof, with means for mounting a broiling rack in diagonal relationship within the oven.

I have chosen to illustrate my invention as applied to an electric range. As shown fragmentarily in Fig. 1, such a range may be considered to have a conventional body construction in which the cabinet 1 has a cooking top 2 provided with the usual plurality of surface cooking units 3. The cabinet further provides an oven cavity 4 having a bottom hinged door 5 (shown in open position in Fig. 1) and a backsplash portion 6 which provides a mounting surface for a plurality of control switches (not shown) for the respective heating elements of the surface cooking units and the oven heating elements. The side walls of the oven cavity have a plurality of embossed protuberances 7, somewhat exaggeratedly shown in Fig. 1, to support the usual oven racks or other supports for the material being cooked within the oven. A typical arrangement of such rack supporting means is shown in Rees Patent 2,168,172, granted August 1, 1939, for "Cabinet Rack." As is usual in electric ranges, the oven cavity is shown as equipped with a lower heating element 8, and an upper heating element 9. These heating elements are commonly known in the art as "baking" and "broiling" elements, respectively; although frequently in baking, the upper element is used—at reduced wattage—together with the fully energized lower unit. In the conventional range, only the upper element is used in broiling operations—by which term I also include cooking operations in which the food is mounted on a rotisserie spit for rotation at a slow rate in relatively close proximity to the radiant heat source.

It is a feature of the present invention that the respective upper and lower units lose their conventional designation as "broiling" and "baking" units, in that both upper and lower units may advantageously be used for broiling, and that both upper and lower units are useful in baking, to a degree hitherto unknown. In Figs. 1 and 9, the food F is shown as impaled on a spit S carried by a rack R. The spit may or may not be mechanically rotated; the bearing means B at the front and at the rear (not shown) of the rack R permit manual or automatic rotation of the spit.

Figure 2:
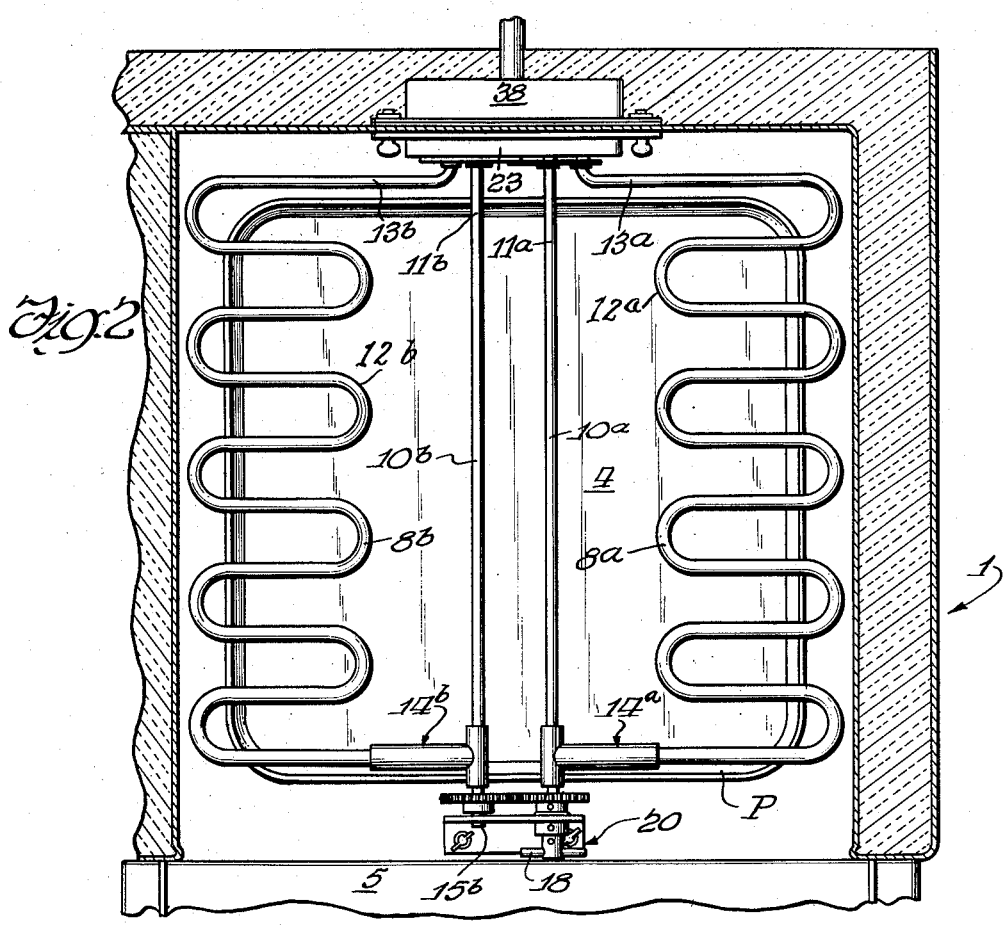
Fig. 2 is a bottom plan view, taken in section along the lines 2—2 of Fig. 1, but showing the lower heating element in its normal flat relationship.

Fig. 2 shows in plan view, the heating element 8, which for simplicity of illustration, may also be typical of the upper element 9. It should be understood that the convoluted shape of the element is intended merely to typify means for increasing the effective area of the heating element and is not a specific or necessarily required configuration. Each of the heating elements comprises two substantially identical units. In the illustrated lower heating element, these units are respectively designated 8a and 8b, each of which is rotatable from the essentially flat arrangement, shown in dotted line in Fig. 1, to a position in which the respective units may be substantially vertical to the top and bottom walls of the oven. It will be also understood that the upper heating element 9 similarly has units 9a and 9b, but, as previously stated, these may be similar to the units 8a and 8b and, therefore, have not been detailed. In either case, the respective units of the heating element are preferably mechanically associated, as later explained, so that the rotation of one of the units effects the rotation of its associated unit. It is, however, within the purview of this invention to have each of the heating element units independently movable.

Figures 3, 4:
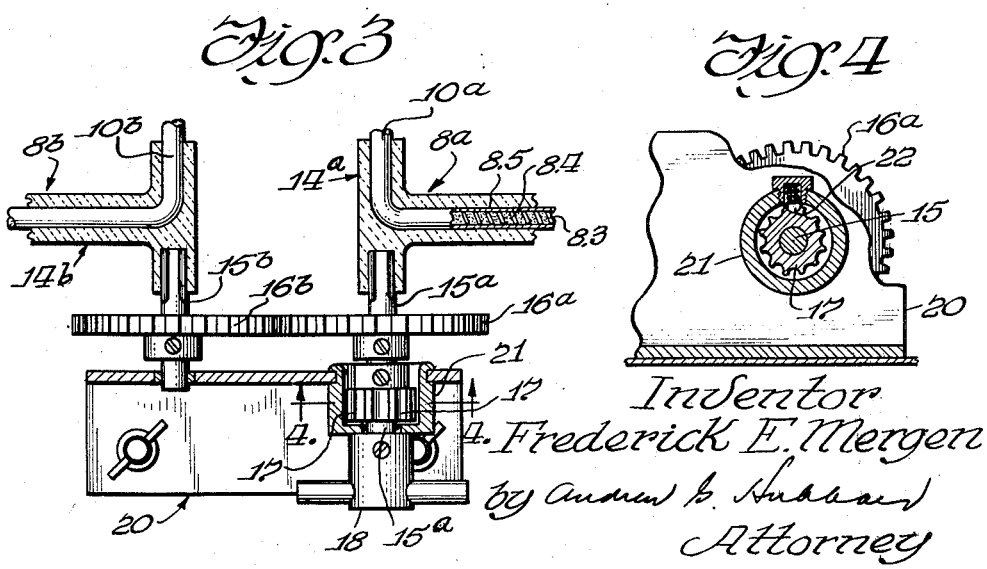
Fig. 3 is an enlarged plan view, partly in section, showing the front-end mounting of the elements of Fig. 2.
Fig. 4 is a sectional elevation taken along the lines 4—4 of Fig. 3.

The respective heating elements 8 and 9 are of the rigid tubular sheathed conductor type, now almost universally used in electric cooking equipment. As indicated in Fig. 3, heating elements of this type comprise a resistance-wire helix 8.3, imbedded in a highly compacted mass 8.4 of an electrically insulating and thermally conducting material, such as powdered magnesium oxide. The outer sheath 8.5 comprises a relatively thin wall metal tube, usually of a nickel-iron alloy. The helix 8.3 is insulated from the sheath 8.5 by the magnesium oxide, as is well understood. As is apparent from a comparison of Figs. 2, 3, and 6, each of the heating element units comprises a closed loop in which the straight run portions 10a and 10b thereof terminate in the respective terminal portions 11a and 11b, and the convoluted portions 12a and 12b terminate in the respective terminal portions 13a and 13b, all of said terminal portions being at the rear of the oven.

The respective heating element units are pivotally supported, as aforesaid, for swinging movements relative to the oven walls. An advantageous way of doing this is by means of a mount for the terminal portions 11a and 11b, as later described, and by means of the T-fixtures 14a and 14b to which are attached the metallic stub shafts 15a and 15b respectively. The respective T-fixtures may, if desired, be of metal, whereby the metallic sheath of the heating element portions may be grounded to the range frame, as presently described. Each stub shaft is established in axial alignment with the respective portion 10a or 10b of the heating unit, so as to provide a front pivot for the unit. As best shown in Fig. 6, each said stub shaft mounts a gear, respectively 16a and 16b. Said gears are in constant mesh. The stub shaft 15a may carry a toothed detent wheel 17 and a knob or handle 18 by means of which the respective mechanically associated heating elements may be rotated. A metal bracket 20 is arranged to be removably secured to the floor of the oven cavity, in electrical connection therewith. Said bracket affords journal bearings for the respective stub shafts; and with respect to that shaft associated with heating element portion 8a, the bracket 20 carries a cup 21 which houses the detent 17 and provides a mounting for the cooperating spring-biased detent ball 22. For simplicity, bracket 20 has been shown as a simple angle iron, although it is contemplated that wall structure will be provided to completely house the respective gears. The bracket is, of course, in electrical connection with the T-fixtures 14a and 14b, and thus provides means for grounding the heating units to the frame of the range.

The rear pivotal mounting is attached to the rear oven wall, and, as shown in Figs. 5 and 6, is removably affixed thereto. The oven wall 4.1 is provided with a rectangular aperture 4.2 of suitable size. A metal cap or housing 23, suitable for complete coverage of the opening, is fitted with bearings 24a and 24b to rotatably receive the respective terminal ends 11a and 11b of the heating units, said bearings, of course, being in axial alignment with the front end bearings in the bracket 20. The cap 23 is electrically connected to the oven wall. Said cap is formed with the respective arcuate slots 25a and 25b to accommodate the terminal ends 13a and 13b of the respective heating units. In order to maintain said slots continuously closed relative to the oven cavity, I prefer to employ segmental guard plates 26a and 26b, fixed on the terminal ends 11a and 11b of the units, for rotation therewith. As best shown in Fig. 6, the respective terminal ends 13a and 13b pass snugly through openings in the respective guard plates. It will, therefore, be obvious that when the handle 18 is manually rotated, the respective heating units associated therewith will be jointly rotated. The detent 17, 22, will hold the units at the desired angular adjustment.

It will be understood that it is within the scope of the invention to provide a handle 18 and detent assembly for each of the stub shafts 15a and 15b, whereupon with the further elimination of the gears 16, the heating units may be individually rotated and positioned.

In arrangements where the T-fixtures 14a and 14b are made of insulating material to reduce transmission of heat to the bracket 20, the guard plates 26a and 26b, being in slidable contact with cap 23, will ground the heating units.

In the illustrated embodiment, the electrical connections to the heating units are behind the rear oven wall 4.1, and I provide terminal means which permit the units to be entirely withdrawn from the oven. For example, as shown in Figs. 6, 7, and 8, I mount an insulation plate 28 on the rear of wall 4.1, said plate being formed with the arcuate slots 29a and 29b, corresponding to and aligning with the similar slots in the cap 23. Secured to insulation plate 28, in precise angular alignment with the respective bearings 24a and 24b in cap 23, are the thimble terminals 30a and 30b having electrical leads 31 connected thereto. The thimble terminals are slotted or otherwise arranged to be yieldable, and each of the terminals, therefore, rotatably and releasably receives the terminal stud 11a' (and 11b' not shown) of the respective heating unit.

For cooperation with the thimble terminals 13a' and 13b', which, obviously, must traverse an arcuate path as the heating units are rotated, I provide terminal plates with which the last-named thimble terminals are pressed into slidable engagement. For example, and as best shown in Figs. 6 and 8, I provide fixed terminal elements 32a and 32b riveted or otherwise permanently attached to the insulating plate 28. Said fixed terminal elements have an arcuate flange, such as the flange 33a, forming the track along which the thimble terminal 13a' passes. Desirably, the flange 33a is ribbed for cooperation with the illustrated groove in the associated thimble terminal 13a'. As shown in Figs. 7 and 8, a pressure plate is provided to insure good surface contact. The pressure plates have been omitted from Fig. 6, to reveal the thimble terminals 13a' and 13b'. As shown, the pressure plates, respectively designated 34a and 34b, are arcuate metallic structures, having a length consistent with that of the associated contact flange. The respective pressure plates are carried on the ends of a plurality of coil springs, such as the springs 35a. Said coil springs in turn are fixed to an anchor plate, such as 36a, secured to the insulation plate 28. As best shown in Figs. 7 and 8, the respective springs 35a and 35b drive their associated pressure plates toward the arcuate terminal flange and, therefore, yieldably hold the associated thimble terminals against said flange. Lead wires 37 are electrically connected to the respective fixed terminal portions. Said lead wires, plus the wires 31, pass through a suitable opening in the rear cover plate 38, and are electrically connected to the switch means (not shown) by means of which the heating units may be connected to an electrical energy circuit (not shown).

The upper heating element 9 may be in all respects similar to the lower heating element 8, and have identical journaling, rotating, and contact means. As shown in Fig. 1, the upper front mounting means has been given the same reference numbers as the lower front mounting means, with the addition of the suffix U. The individual units of the upper heating elements may, however, be fitted with reflectors 40 to focus the radiant energy on the foodstuff. No reflectors are used on the lower elements 8, in order to avoid interference with the usual drip or baking pan P, positioned at the bottom of the oven.

In the arrangement shown in Fig. 9, the respective heating elements have been designated 8R and 9L, in view of the support thereof adjacent the right- and left-hand oven walls. The front pivotal mounting and the rear pivotal mounting and contact structure may be in all respects similar to those previously described. The front pivotal mounting structures will, of course, be removably affixed to the front of the respective oven side walls, whereas it is more advantageous to mount the rear pivotal supports and contact assemblies appropriately on the rear oven wall. It will be understood, of course, that the respective heating elements will have heating units similar in construction to that described with respect to the units 8a and 8b; although, as shown in Fig. 9a, the respective units are of simple quadrilateral shape rather than the convoluted shape of Fig. 2, in order to permit a baking pan (not shown) to extend through the heating units for support on the oven wall embosses 7.

In Fig. 10, the heating elements have been disposed at the upper right and lower left corners of the oven 4, and have been designated 8c and 9c, respectively. The individual heating unit arrangement may be either of the convoluted shape of Fig. 2, or the rectangular shape of Fig. 9a, according to the requirements for the support and disposition of oven racks (not shown). The front end pivot supports 20CR and 20CL are arranged to carry at the indicated corners thereof, channel members 42, 43 for the slidable support of a broiler rack 44. Said channel members need extend only a few inches rearwardly to provide ample support for the broiler rack. The increased length and area of the diagonally arranged broiler rack, as compared with racks disposed in horizontal or vertical positions, increases the broiling capacity of the oven. In addition, the corner location of the heating elements produces improved convection patterns when element 9c is the only energized heating element. In such an arrangement, the left-hand portions of the oven bottom and the lower portion of the left-hand oven wall are heated, whereas the right-hand oven wall portions remain cool, thus establishing optimum conditions for the circulation of heat by convection currents.

Recapitulating, cooking apparatus embodying adjustable heating elements, pursuant to the present invention, enjoys improved applications of heat to the foodstuff being cooked. Whereas in conventional domestic cooking ranges, for example, only one side of foods being broiled may be brought into close proximity to the radiant heat source, my invention provides for simultaneously bringing the heat source at desired positions relative to both sides of the food with substantial reduction in cooking time and improvement in the end product. Baking and roasting may be facilitated by the opportunities afforded the cook to position the individual units of the respective heating elements in a wide variety of arrangements most adaptable to the size and shape of the foodstuff.

While there has been described what is at present considered to be the preferred embodiment of the invention, it will be understood that various modifications may be made therein, and it is intended to cover in the appended claims all such modifications as fall within the scope of the invention.

I claim:

1. An electric range or the like, comprising structure providing an oven cavity, a bearing structure fixed to a wall of said cavity, at least one electrical heating element disposed within said cavity, said heating element comprising a resistor insulatedly housed within a tubular metallic sheath formed to define an open structure of essentially flat, rectangular outline, a portion of said sheath extending parallel to and adjacent to a wall of said oven cavity, an end of said sheath portion entering said bearing structure for rotation therein, means secured to the opposite end of said sheath portion for pivotally mounting the same, whereby said heating element is pivotally supported at two spaced locations for rotation relative to the said wall of said oven cavity, means for connecting the said resistor to a source of electrical energy, and means for securing said heating element in a desired angular relation to said wall.

2. An electric cooking appliance, comprising wall means providing a cooking chamber, at least one electrical heating element disposed within said chamber, said heating element comprising a tubular sheath and a resistance element insulatedly disposed therein, said sheath having rigid end portions arranged in parallel mutually spaced relation at one end of said heating element and the resistance element having rigid terminal members extending from said sheath end portions, means disposed on a wall of said chamber for releasably and rotatably receiving said sheath end portions whereby said heating element is mounted for rotation relative to said chamber, electrically conductive socket means disposed immediately adjacent said heating element mounting means for receiving said resistance element terminal members while permitting the said rotation of said heating element, and means for connecting said socket means to an electric energy circuit, whereby said heating element may be energized at any position within the arc of rotation permitted by said mounting means.

3. An electric range, comprising a substantially rectangular cooking chamber, a heating element having an outline defining a plane and pivotally mounted in an upper corner of the chamber, a second heating element having an outline defining a plane and pivotally mounted in the diametrically opposite corner of said chamber, a frame for supporting foodstuff to be cooked, means for slidably mounting said frame in a plane extending from one to the other of said diametrically opposite corners, and means for moving said heating elements from a position substantially parallel to an adjacent wall of said chamber to a position substantially parallel to said frame.

4. A heating element for a heating chamber comprising a substantially rectangular heating unit of the electrical resistance type, terminal members at one end of said heating unit, said members being in substantially parallel spaced relation, means including a bracket member fixed to a wall of said chamber for pivotally mounting said heating unit at one end thereof, terminal structure secured to a wall of said chamber at the terminal end of said heating unit for rotatably and releasably receiving a terminal member of said heating unit, said terminal structure forming a pivot for the rotation of said heating unit, and a second terminal structure fixed relative to a wall of said chamber for slidably receiving another terminal member of said heating unit during the rotation of said unit.

5. A heating element according to claim 4 in which the first named pivotal mounting for the heating unit includes a shaft member fixed to said heating unit and journalled in said bracket member.

6. A heating element for a heating chamber, comprising a substantially rectangular electric resistance heating unit, terminal members at one end of said heating unit, means for pivotally mounting said heating unit for rotation about one of its sides as an axis, said means including a bracket member secured to a wall of said chamber, terminal structure secured to a wall of said chamber at the terminal end of said heating unit for rotatable engagement with one of said heating unit terminals and forming a pivot for the rotation of said heating unit relative thereto, and a second terminal structure fixed relative to said oven wall and maintaining an electrical connection with another of said heating unit terminal members during the rotation of said heating element.

7. A heating element according to claim 6 in which said heating unit is in the form of a closed loop and the first named pivotal mounting means includes a T-shaped member fixed to the heating unit and having a stub shaft extending therefrom and rotatably received by said bracket member.

8. A heating element for a heating chamber, comprising a pair of substantially rectangular electrical resistance heating units having adjacent side portions extending in spaced parallel relation, each of said heating units having a pair of terminal members extending therefrom in spaced parallel relation, means including a bracket member fixed to a wall of said chamber for rotatably mounting one end of each of said heating units, terminal structure secured to a wall of said chamber at the terminal end of said heating units, said terminal structure having terminal means individual to a terminal member of the respective heating units to rotatably and releasably receive said heating unit terminal members, the respective terminal means forming pivots for the rotatable support of the respective heating units, and terminal means for individually slidably receiving the other terminal member of the respective heating units to maintain electrical connection therewith during the rotation of the associated heating unit.

9. An electric cooking appliance, comprising a substantially rectangular cooking chamber, a first heating element of the electrical resistance type arranged in a shape defining a substantially rectangular plane, means for pivotally mounting said heating element along a corner of said cooking chamber for movement between a position in which the heating element is parallel to a horizontal wall of said chamber and a position in angular relation thereto, a second heating element of the electrical resistance type having a shape similar to the first named element, means for pivotally mounting said second heating element along a corner of said cooking chamber for movement between a position parallel to a vertical wall of said chamber and a position in angular relation thereto, means for securing said heating elements in selected angular relation to said chamber walls, means for supporting an article to be cooked within said cooking chamber in spaced relation to said vertical and horizontal walls whereby it will be exposed to heat energy from the heating elements regardless of the angular positioning thereof, and means for connecting the said heating elements to a source of electrical energy.

References Cited in the file of this patent

UNITED STATES PATENTS

| | | |
|---|---|---|
| 1,637,435 | Brown | Aug. 2, 1927 |
| 2,257,580 | Trompeter | Sept. 30, 1941 |
| 2,470,645 | Reichart | May 17, 1949 |
| 2,478,253 | Doner | Aug. 9, 1949 |
| 2,597,470 | Skocic | Mar. 25, 1952 |
| 2,767,298 | Fry | Oct. 16, 1956 |

FOREIGN PATENTS

| | | |
|---|---|---|
| 265,848 | Italy | July 9, 1929 |
| 713,869 | Great Britain | Aug. 18, 1954 |